Nov. 14, 1967     E. L. MACOICZ ETAL     3,352,999
ELECTRIC WATER HEATER CIRCUIT
Filed April 28, 1965
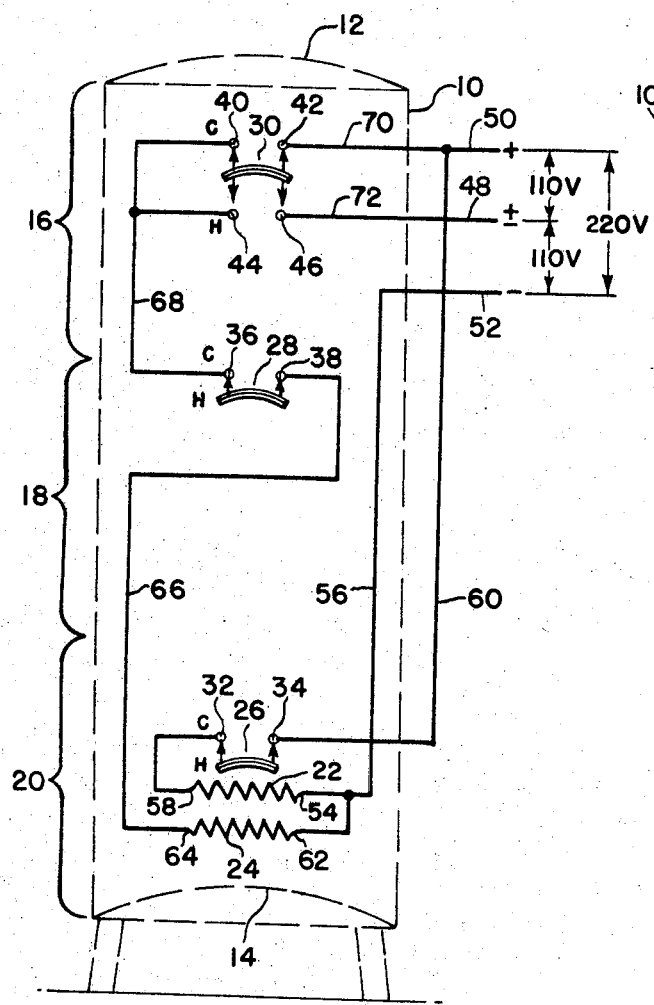
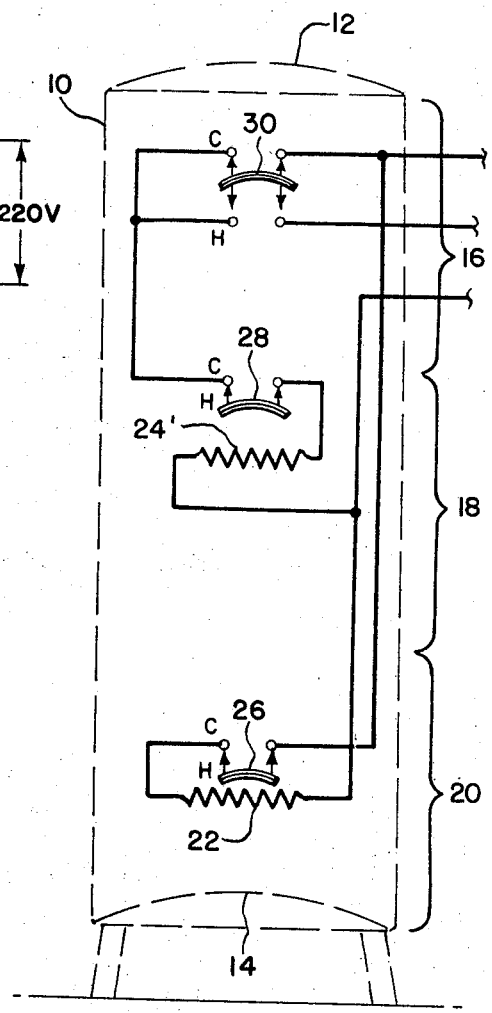
INVENTORS
Edward L. Macoicz
Allyn H. Fitzpatrick
By *Derek P. Lawrence*
Attorney United States Patent Office 3,352,999
Patented Nov. 14, 1967

3,352,999
ELECTRIC WATER HEATER CIRCUIT
Edward L. Macoicz, Shorewood, and Allyn H. Fitzpatrick, Greendale, Wis., assignors to General Electric Company, a corporation of New York
Filed Apr. 28, 1965, Ser. No. 451,486
5 Claims. (Cl. 219—321)

ABSTRACT OF THE DISCLOSURE

Electric heater circuit means for a water tank having a lower water inlet portion, an upper water outlet portion and a middle portion. The circuit means include first and second electrical heating elements located either in the lower, or in the lower and middle tank portions, respectively, and three thermally responsive switching devices responsive to water temperatures in the tank lower, middle and upper portions, respectively. The electrical heating elements are energized through the switching devices from a three-wire single-phase power system. The arrangement of the circuit means is such that either, or both, of the heating elements can be energized and that the second heating element can be energized at two different power levels by applying different voltages to it. Hence, three different levels of heat recovery can be automatically provided by the two heating elements.

---

This invention relates to an electric water heater circuit. More specifically, it relates to an electric water heater circuit which provides improved recovery as well as automatic flexibility of recovery.

It is an object of this invention to provide an electric water heater having automatic flexibility of recovery.

It is another object of this invention to provide an electric water heater providing both rapid recovery and flexibility of recovery, and which utilizes standard circuit components and is therefore relatively economical to manufacture.

These objects are accomplished in accordance with this invention, in one form thereof, by providing a water heater tank with two electrical heating elements and with three thermostatic switching devices. The electric heating elements are energized through the switching devices from a three-wire, single-phase power system. The switching devices are positioned so as to be sensitive to the tank temperature in its upper, middle, and lower portions. The circuit arrangement is such that either, or both, of the heating elements can be energized, and that one of the elements can be energized at two different levels by applying different voltages to it.

Other objects and further details of that which is believed to be novel in the invention will be clear from the following description and claims taken with the accompanying drawing wherein:

FIGURE 1 is a circuit diagram of the arrangement of this invention for energizing heating elements of an electric water heater, and shows the physical location of the circuit components with respect to the water tank, and FIGURE 2 is a diagram similar to FIGURE 1 showing a modified physical relationship of the heating elements.

A cyclindrical water heater tank 10 which has a domed top 12 and a concave bottom 14 is divided into three portions, an upper portion 16, a middle portion 18, and a lower portion 20, to aid in describing the location of the circuit components. For proper operation of the improved circuit arrangement of this invention, it is necessary to locate the electrical circuit elements in a particular portion of the tank 10.

A first electrical heating element 22 is located in the lower portion 20 of the tank. A second electrical heating element 24 is also located in the lower portion 20 of the tank, but may in an alternate arrangement be located in the middle portion 18 as is shown by heating element 24' in FIGURE 2. The heating elements, which are typically sheathed waterproof electrical resistance heating elements, are placed within the tank 10, with their electrical connections extending through sealed apertures in the tank wall. Three thermally responsive switches 26, 28 and 30 are respectively responsive to the temperatures of the lower portion 20, the middle portion 18, and the upper portion 16. The thermally responsive switches 26, 28 and 30 are each provided with a pair of normally closed contacts, 32 and 34, 36 and 38, and 40 and 42, respectively. In addition the thermally responsive switch 30, which is of a double-throw type, it also provided with a pair of normally open contacts 44 and 46. One convenient location for the thermally responsive switches is on the outer wall of the tank, in a heat transfer relationship with respect to the wall so as to be responsive to the temperature of the water in the tank.

Heating elements 22 and 24 are energized through the switches 26, 28, and 30 from a three-wire, single-phase power system. The power lines are conveniently identified as a neutral line 48, and outer lines 50 and 52 and have the instantaneous polarities shown in FIGURE 1. The line voltages provided by this three-wire system, 110 volts between the neutral line 48 and the outer lines 50 and 52, and 220 volts between the two outer lines, are shown in the upper right hand portion of the figure.

A first terminal 54 of heating element 22 is connected to outer line 52 by a conductor 56. A second terminal 58 of heating element 22 is connected through the normally closed contacts 32 and 34 of switch 26 to outer line 50 by a conductor 60. Heating element 24 has a first terminal 62 connected to outer line 52 by the conductor 56. A second terminal 64 of heating element 24 is connected in series with normally closed contact 38 of switch 28 by a conductor 66. The other normally closed contact 36 of switch 28 is connected by a conductor 68 in series with normally closed contact 40 and normally open contact 44 of switch 30. The other normally closed and normally open contacts 42 and 46, respectively, of switch 30 are respectively connected to outer line 50 and neutral line 48 by conductors 70 and 72, respectively.

The operation of the circuit arrangement of this invention will now be described assuming that the tank 10 has been filled with cold water. Under such a condition the switches 26, 28 and 30 will move to the positions indicated by the letters C in FIGURE 1. That is, the normally closed contacts of switches 26, 28 and 30 will be closed, and the normally open contacts 44 and 46 of switch 30 will be open. The letter C indicates the normal or cold position of the thermally responsive switches. The letter H indicates the actuated or hot position of the thermally responsive switches. The thermally responsive switches 26, 28 and 30 are adjusted to move from their first normal or cold positions indicated by the letters C to their second actuated or hot positions indicated by the letters H at approximaely the same predetermined temperature. With switch 26 in the position indicated by the letter C, heating element 22 is connected across lines 50 and 52, and is therefore energized by 220 volts. With switches 28 and 30 in the positions indicated by the letter C, heating element 24 is also connected across lines 50 and 52, thereby being energized by 220 volts.

Heating of the cold water within the tank 10 by the heating elements 22 and 24 will cause heated water to rise in the tank, displacing the cold water to the lower portion 20 of the tank. Natural convection of water within the tank will cause switches 28 and 30 to move to their second or hot position, indicated by the letter H, before switch 26 does the same. Generally, hotter water would be found in the upper portion 16 of the tank but due to the rise of hot water from the heating elements 22 and 24 the temperature of the water in the middle portion 18 is found to be approximately the same as that in the upper portion 16 during the initial heating of water in the tank. Therefore, switches 28 and 30 move to the positions indicated by the letter H at approximately the same time.

The moving of switch 28 to the position indicated by the letter H de-energizes heating element 24. When the water in the lower portion 20 of the tank reaches the predetermined temperature switch 26 moves to the position indicated by the letter H, thereby de-energizing heating element 22.

During draw-off of hot water from the top of the tank, cold water enters the tank near the bottom 14 (water inlet not shown). Therefore during draw-off, switch 26 in the lower portion 20 is the first to move to the position indicated by the letter C, thereby energizing heating element 22. If the draw-off of hot water from the tank should continue at a rate such that the recovery provided by heating element 22 is not sufficient to heat the cold water which has entered the tank, the stratum of cold water within the tank will rise into the middle portion 18, whereupon switch 28 will move to the position indicated by the letter C. With switch 28 in the position indicated by the letter C, and with switch 30 remaining in the position indicated by the letter H, heating element 24 is connected between lines 48 and 52, thereby being energized by 110 volts. Since power dissipated by an electrical resistance heating element varies directly with the square of the voltage, it will be seen that the heat now provided by heating element 24 is one-fourth of that provided by heating element 22. Still further draw-off of hot water from the tank at a rate faster than recovery provided by the energization of heating element 22 by 220 volts and heating element 24 by 110 volts will cause the cold water stratum to reach the upper portion 16. Switch 30 will then move to the position indicated by the letter C. With switch 30 in the position indicated by the letter C, heating element 24 is connected between lines 50 and 52, thereby being now energized by 220 volts. This doubling of the voltage applied to heating element 24 quadruples the heat provided by it.

It has thus been seen that the circuit arrangement of this invention provides three levels of recovery in an electric water heater provided with two electrical heating elements. The elements 22 and 24, which are preferably identical, are, in a device constructed according to this invention, rated to each dissipate 3000 watts when energized at 220 volts. Therefore on initial draw-off of hot water, with only switch 26 in the position indicated by the letter C, recovery is provided at the rate of 3000 watts by heating element 22. With further draw-off at a rate faster than the recovery provided by the 3000 watts, heating element 24 is energized at 110 volts when switch 28 assumes the position indicated by the letter C. Heating element 24 provides one-fourth its rated power, that is, 750 watts. The combined recover power of the two heating elements is 3750 watts. With continued draw-off at a rate greater than the recovery provided by the 3750 watts, heating element 24 is energized by 220 volts rather than 110 volts, whereupon it provides a recovery power of 3000 watts for combined total recovery power of 6000 watts. With both heating elements 22 and 24 energized by 220 volts, the maximum current demand is with a 30 ampere limit, which is a desirable limit on the current capacity for a circuit supplying power to an electric water heater.

With electrical heating unit 24 located in the lower portion 20 of the tank, as shown in FIGURE 1, heating elements 22 and 24 are conveniently formed as a single unit, with a resultant reduction in cost as compared to two separate units. Better distribution of heating is provided by locating heating element 24' in the position shown in FIGURE 2. Also, with the heating element in the position indicated by 24' somewhat faster recovery is provided in the middle portion 18 and upper portion 16 of the water heater.

While a particular embodiment of the invention has been shown, other embodiments of the invention will be apparent to those skilled in the art, and it is intended to cover by the appended claims all embodiments falling within the scope thereof.

What we claim as new and desire to secure by Letters Patent of the United States is:

1. In an electric water heater, an arrangement for energizing a pair of electrical heating elements from a three-wire, single-phase system which includes a neutral line and first and second outer lines, comprising:
   (a) a water tank having a lower water inlet portion, an upper water outlet portion and a middle portion,
   (b) a first electrical heating element disposed within said water tank in said lower portion, said first electrical heating element having first and second terminals,
   (c) a second electrical heating element disposed within said water tank below said upper portion, said second electrical heating element having first and second terminals,
   (d) means connecting said first terminals of said first and second electrical heating elements to the first outer line,
   (e) a first thermally responsive switch connecting said second terminal of said first electrical heating element to the second outer line, said first thermally responsive switch being normally closed, and opening when water in said lower portion of said tank reaches a first predetermined temperature,
   (f) a second thermally responsive switch connected to said second terminal of said second electrical heating element, said second thermally responsive switch being normally closed, and opening when water in said middle portion of said tank reaches a predetermined temperature approximately the same as said first predetermined temperature,
   (g) a third thermally responsive switch connected in series with said second electrical heating element and said second thermally responsive switch, said third thermally responsive switch being of a double-throw type normally connecting, through said second thermally responsive switch, said second terminal of said second electrical heating element to the second outer line; and connecting said second terminal of said second electrical heating element to the neutral line through said second thermally responsive switch when water in said upper portion of said tank reaches a predetermined temperature approximately the same as said first predetermined temperature, whereby said second electrical heating element is provided with two levels of energization for automatic flexibility of recovery of water temperature within said tank.

2. The electric water heater arrangement defined in claim 1 wherein said second electrical heating element is disposed within said water tank in said middle portion.

3. The electric water heater arrangement defined in claim 1 wherein said first and second electrical heating elements are both disposed within said water tank in said lower portion.

4. In an electric water heater, an arrangement for energizing a pair of electric heating elements from a three-wire single-phase system which includes a neutral line and first and second outer lines, comprising:
   (a) a water tank having a lower water inlet portion, an upper water outlet portion and a middle portion,
   (b) a first electrical heating element disposed within said tank lower portion,
   (c) a second electrical heating element disposed within said tank below said upper portion, (d) first thermally responsive circuit means
  (i) responsive when water temperature in said tank lower portion is below a first predetermined temperature to connect said first heating element across the outer lines and
  (ii) responsive when water temperature in said tank lower portion is above said first predetermined temperature to disconnect said first heating element from across the lines, and
(e) second thermally responsive circuit means
  (i) responsive when water temperatures in both said tank middle and upper portions are below a predetermined temperature approximately the same as said first predetermined temperature to connect said second heating element across the outer lines,
  (ii) responsive when water temperature in said tank middle portion is below and water temperature in said tank upper portion is above a predetermined temperature approximately equal to said first predetermined temperature to connect said second heating element across the neutral line and one of the outer lines, and
  (iii) responsive when water temperature in said tank middle portion is above a predetermined temperature approximately the same as said first predetermined temperature to disconnect said second heating element from across the lines.

5. The invention of claim 4, wherein:
(a) said first circuit means includes a first thermally responsive switch responsive to water temperature in said tank lower portion, and
(b) said second circuit means comprises series-connected second and third thermally responsive switches,
  (i) said second switch being responsive to water temperature in said tank middle portion and
  (ii) said third thermally responsive switch being of a double-throw type responsive to water temperature in said tank upper portion.

References Cited
UNITED STATES PATENTS

| | | | |
|---|---|---|---|
| 2,380,545 | 7/1945 | Pankow | 219—321 |
| 3,246,119 | 4/1966 | Kinsella | 219—321 |

ANTHONY BARTIS, *Primary Examiner.*